United States Patent [19]
Ernst et al.

[11] Patent Number: 5,887,098
[45] Date of Patent: Mar. 23, 1999

[54] FIBER OPTIC ADAPTER WITH PROTECTIVE SHIELD

[75] Inventors: Scot A. Ernst, Downers Grove; Igor Grois, Northbrook; Ilya Makhlin, Wheeling, all of Ill.

[73] Assignee: Molex Incorporated, Lisle, Ill.

[21] Appl. No.: 806,361

[22] Filed: Feb. 27, 1997

[51] Int. Cl.[6] .................................................. G02B 6/36
[52] U.S. Cl. .............................. 385/55; 385/60; 385/75; 385/78
[58] Field of Search .......................... 385/19, 31, 53–56, 385/58–60, 70–73, 75, 88, 89, 92, 78

[56] References Cited

U.S. PATENT DOCUMENTS

| | | | |
|---|---|---|---|
| 4,598,715 | 7/1986 | Mächler et al. | 385/31 X |
| 4,611,887 | 9/1986 | Glover et al. | 350/96.21 |
| 4,712,861 | 12/1987 | Lukas et al. | 350/96.21 |
| 4,738,506 | 4/1988 | Abendschein et al. | 385/19 |
| 4,779,950 | 10/1988 | Williams | 350/96.21 |
| 4,960,317 | 10/1990 | Birggs et al. | 350/96.21 |
| 5,202,949 | 4/1993 | Hileman et al. | 385/134 |
| 5,348,487 | 9/1994 | Marazzi et al. | 385/78 X |
| 5,363,460 | 11/1994 | Marazzi et al. | 385/70 |
| 5,506,922 | 4/1996 | Grois et al. | 385/75 |
| 5,687,268 | 11/1997 | Stephenson et al. | 385/73 |
| 5,708,745 | 1/1998 | Yamaji et al. | 385/92 |

FOREIGN PATENT DOCUMENTS

0364075A1  7/1989  European Pat. Off. ...... H01R 13/447

*Primary Examiner*—John D. Lee
*Attorney, Agent, or Firm*—A. A. Tirva

[57] ABSTRACT

An apparatus is provided for receiving a fiber optic connector along an optic axis. The apparatus includes a body having an open mating end and a mounting flange. The open mating end is adapted for receiving the fiber optic connector on the optic axis. The mounting flange includes a first mounting structure for facilitating mounting the apparatus to a support structure. A shield assembly is mounted on the body and includes a movable shield for closing and opening the open mating end of the body. A second mounting structure is operatively associated with the first mounting structure for facilitating mounting the shield assembly to the body.

21 Claims, 6 Drawing Sheets

FIBER OPTIC ADAPTER WITH PROTECTIVE SHIELD

FIELD OF THE INVENTION

This invention generally relates to the art of fiber optic connectors and, particularly, to a receptacle apparatus, such as an adapter, which has a shield to protect the interior of the adapter and to prevent light energy from exiting the adapter.

BACKGROUND OF THE INVENTION

Fiber optic connectors of a wide variety of designs have been employed to terminate optical fiber cables and to facilitate connection of the cables to other cables or other optical fiber transmission devices. A typical optical fiber connector includes a ferrule which mounts and centers the optical fiber within the connector. The ferrule is mounted in some form of ferrule holder which is assembled within another body member of the connector. The ferrule may be fabricated of such material as ceramic, and the ferrule holder typically is molded from plastic material. When the ferrule holder is assembled within the body member of the connector, it is biased by a spring such that the ferrule yieldably projects from the connector for engaging another fiber-mounting ferrule of a mating connecting device. A pair of connectors often are mated in an adapter which centers the fibers to provide low insertion losses. The adapter couples the connectors together so that their encapsulated fibers connect end-to-end.

Various problems are encountered when terminating optical fibers in fiber optic connectors versus terminating electrical conductors in electrical connectors, when situations arise wherein a fiber end of an "active" fiber optic connector is exposed. A typical situation might arise when one of the fiber optic connectors at one end of an adapter is removed, leaving the other "active" fiber optic connector in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed end of an active optical fiber. For instance, an operator's eyes may be damaged from dangerous light beams exiting an unprotected receptacle or adapter.

Heretofore, dust covers, end caps or spring-loaded shutters have been used to close an open end of an adapter to, thereby, cover the exposed fiber ends to protect the fiber ends from adverse environmental hazards and to prevent light energy from the fiber ends from exiting the adapter. Many of these apparatus are quite complicated and require that the adapter either be modified or custom designed with the dust cover, end cap or spring-loaded shutter.

On the other hand, there are many adapters presently in use which do not have such protective apparatus. It would be desirable to be able to use existing or conventional adapters with a protective shutter or shield without extensively modifying the adapter. For instance, one popular conventional or standard optical fiber connector for which adapters are provided is known as an SC connector. An SC connector is connected to another SC connector through an adapter by linear motion only. Another popular conventional or standard optical fiber connector for which adapters are provided is known as an FC connector. Two FC connectors may be placed in optical connection with each other through an adapter. Each FC connector is assembled to the adapter by turning threadably each FC connector onto an externally threaded portion of the adapter.

The present invention is directed to solving the various problems identified above by a protective shield or shutter which can be used with an adapter for a conventional or standard fiber optic connector, without modifying the adapter in any way. As disclosed herein, the invention is embodied in an adapter for coupling one or more FC connectors.

SUMMARY OF THE INVENTION

An object, therefore, of the invention is to provide a new and improved apparatus, such as an adapter, for receiving a fiber optic connector along an optic axis, with the apparatus including a protective shield or shutter.

In the exemplary embodiment of the invention, the adapter apparatus includes a body having an open mating end and a mounting flange. The mating end is adapted for receiving the fiber optic connector on the optic axis. The mounting flange includes a first mounting structure for facilitating mounting the device to a support structure such as a panel or the like. A shield assembly is mounted on the body and includes a movable shield for closing and opening the open mating end of the body. The shield assembly includes a second mounting structure operatively associated with the first mounting structure of the body for facilitating mounting the shield assembly to the body. Therefore, the body of the apparatus does not have to be modified in any way to mount the shield assembly.

As disclosed herein, the first and second mounting structures include first and second alignable holes, respectively, for receiving therethrough conjointly a common fastening device, such as a bolt or screw. The shield assembly includes a spring for biasing the shield toward a closed position closing the open mating end of the body.

The invention is disclosed in three embodiments. In one embodiment, the shield has a one-piece shield member movable toward and away from a closed position closing the open mating end of the body. The second mounting structure includes a hollow journal integral with the one-piece shield member. The first mounting structure of the body is a hole in the mounting flange of the body alignable with the hollow journal for receiving therethrough conjointly the common fastening device.

In a second embodiment, the shield includes a pair of shield halves movable toward and away from each other toward and away from a closed position closing the open mating end of the body. Like the one-piece shield member, the pair of shield halves include a pair of hollow journals alignable with a hole in the first mounting structure of the body for receiving therethrough conjointly the common fastening device.

The third embodiment is similar to the second embodiment but includes a different mounting arrangement for the one-piece shield member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
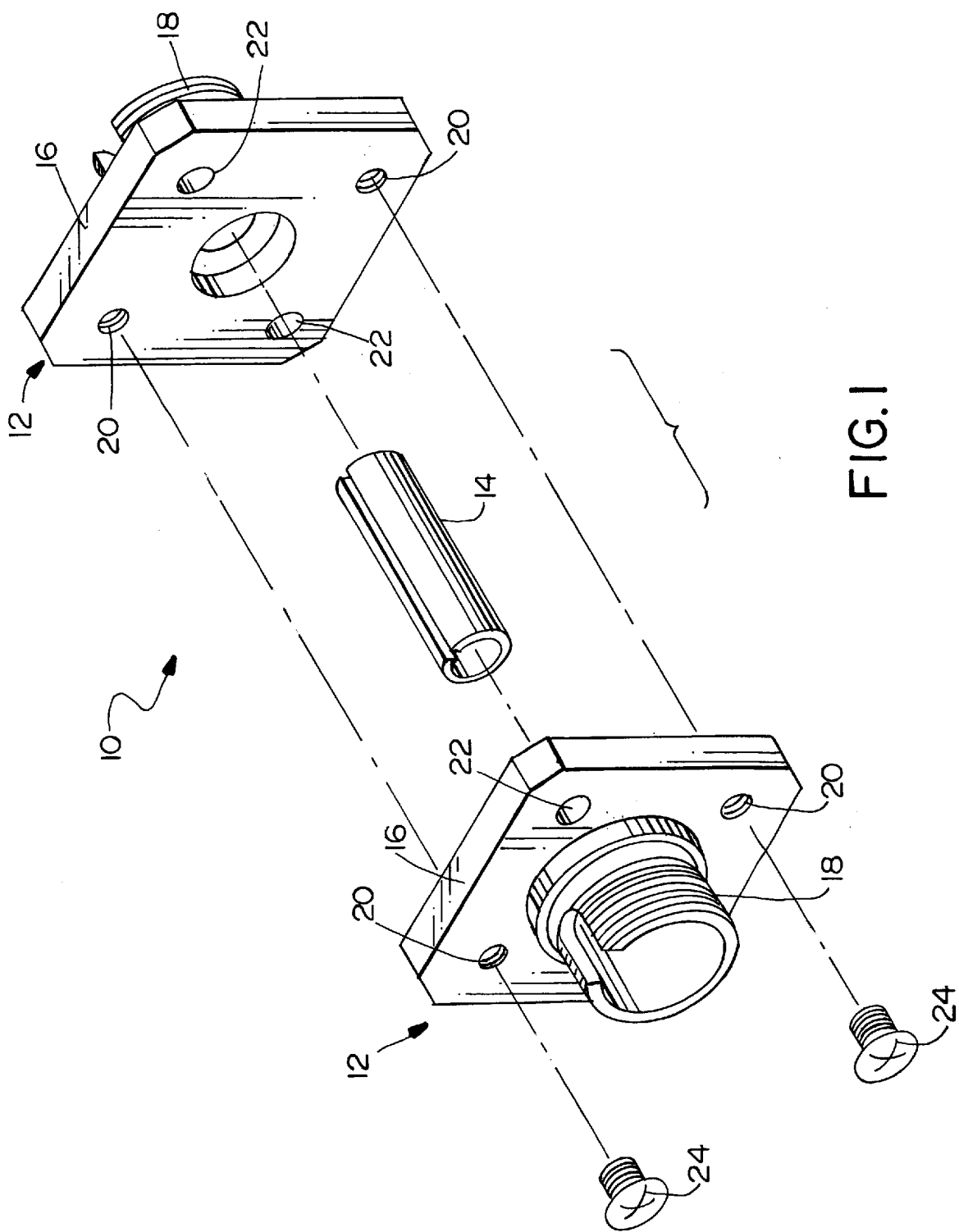
FIG. 1 is an exploded perspective view of an adapter apparatus with which the invention is applicable, and with certain components of the apparatus omitted to facilitate the illustration.

Referring to the drawings in greater detail, and first to FIG. 1, a FC-type adapter, generally designated 10, is shown to include a pair of body halves, generally designated 12, with a split sleeve 14 therebetween.

Each body half 12 of adapter 10 is substantially identical and includes a rectangular mounting flange 16 and an outwardly projecting, open mating end 18 in the form of an externally threaded coupling. A first pair of mounting holes 20 are located in diagonally opposite corners of mounting flange 16, and a second pair of mounting holes 22 are located in the other diagonally opposite corners of the flange. Mounting holes 20 are provided for receiving therethrough a pair of fastening devices, such as threaded bolts or screws 24, for securing body halves 12 together with mounting flanges 16 thereof in abutment, and with open mating ends 18 of the bodies projecting outwardly on opposite sides of the adapter. For instance, mounting holes 20 in the flange of the left-hand body half shown in FIG. 1 may be unthreaded, with holes 20 in the mounting flange of the right-hand body half being threaded to receive bolts 24 which secure the body halves together. Holes 22 in the other two diagonally disposed corners of the mounting flanges can be used for mounting the assembled adapter to a support structure, such as a panel.

Figure 2:
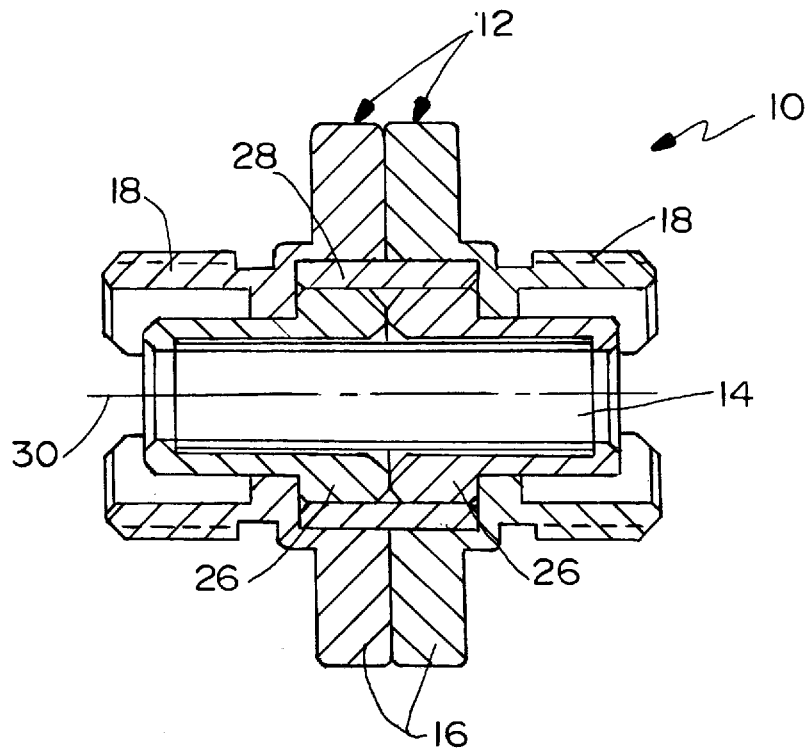
FIG. 2 is an axial section through the adapter apparatus in assembled condition.
Figure 3:
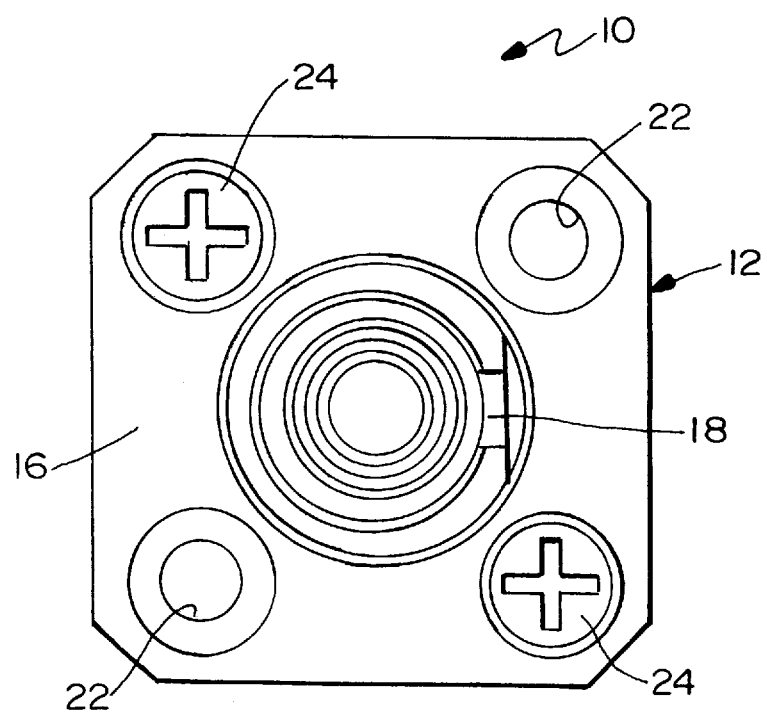
FIG. 3 is an end elevational view of the adapter apparatus.

FIG. 2 shows adapter apparatus 10 in fully assembled condition, with mounting flanges 16 of body halves 12 held in abutting relationship by bolts 24 (FIG. 3). The complete adapter apparatus includes a pair of tubular holders 26 which, in turn, or held together by an outer retaining ring 28. Split ring 14 spans both tubular holders 26 and defines an optic axis 30 extending entirely through the adapter whereby a pair of FC connectors can be threaded onto oppositely directed mating ends 18 on the optic axis.

Figure 4:
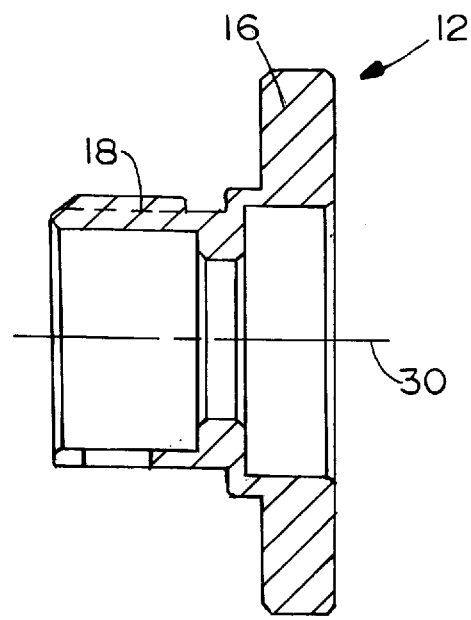
FIG. 4 is an axial section through the body of one-half of the apparatus.
Figure 5:
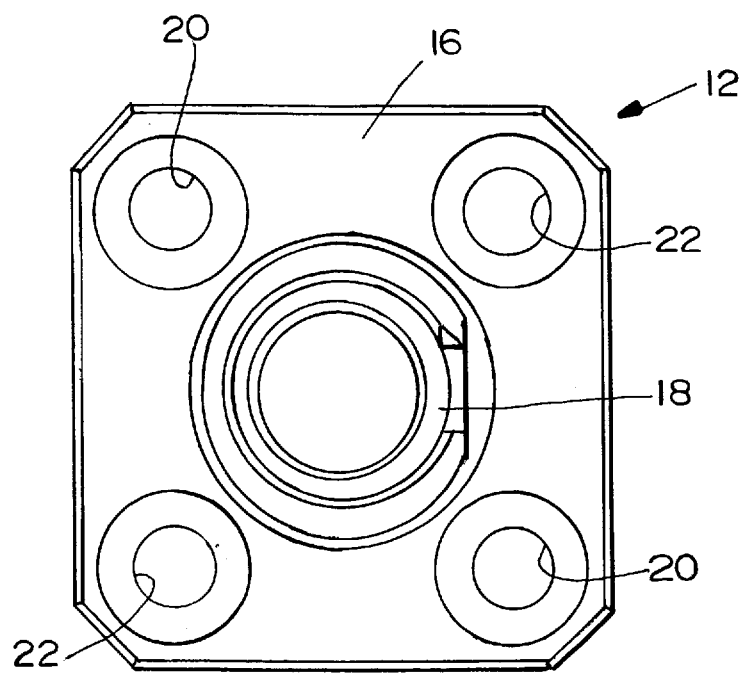
FIG. 5 is an end elevational view of the body of FIG. 4.

As stated above, adapter apparatus 10 is of a typical structure for an FC-type adapter for mating a pair of FC-type fiber optic connectors. It also should be understood that only one body half 12 (FIGS. 4 and 5) can be used and mounted directly to an appropriate support structure such as a panel, without the other body half 12 and still receive an FC-type fiber optic connector. The shield concepts of the invention are applicable for a variety of adapters for fiber optic connectors.

Figure 6:
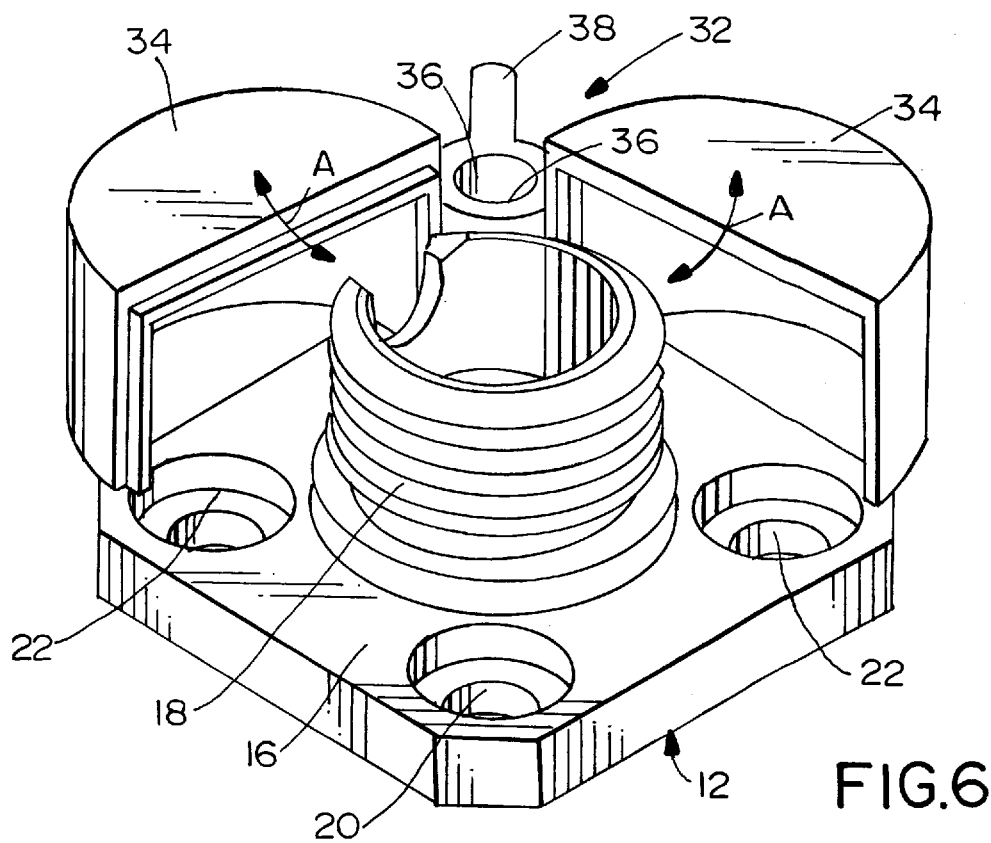
FIG. 6 is a perspective view of one embodiment of the shield assembly of the invention, mounted on the body half of the adapter.
Figure 7:
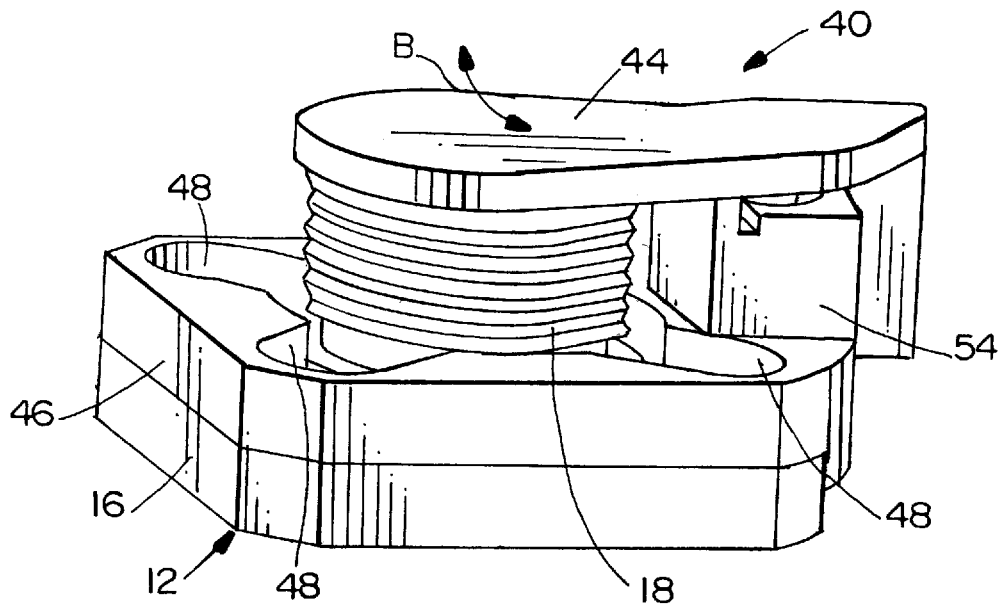
FIG. 7 is a perspective view of a shield assembly according to a second embodiment of the invention, the assembly being mounted on the body half of the adapter.
Figure 8:
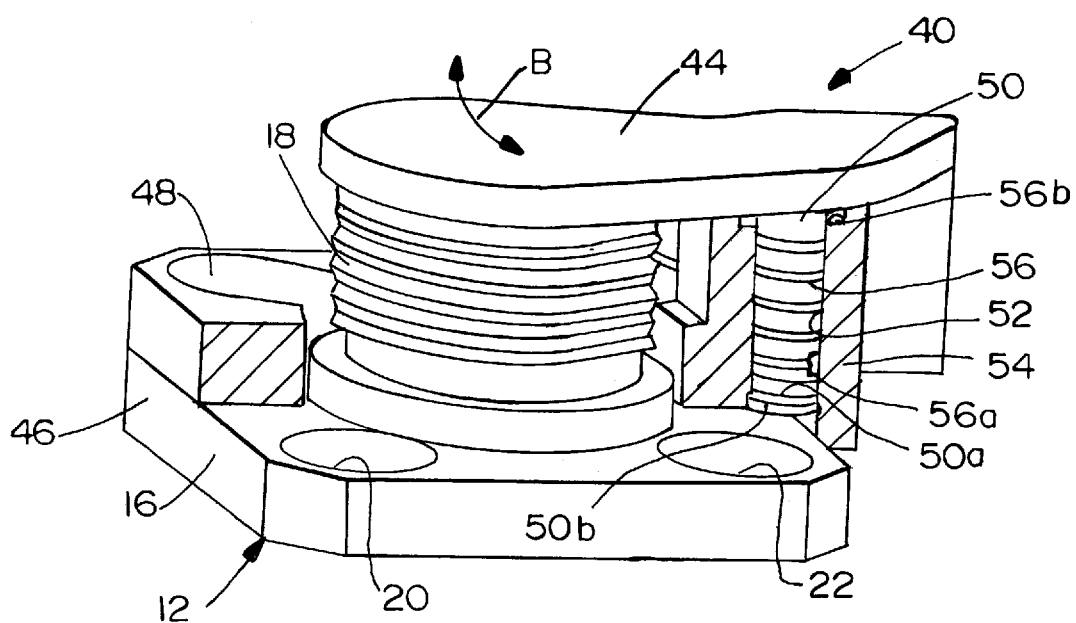
FIG. 8 is a view similar to that of FIG. 7, with a portion of the mounting plate of the shield assembly in section to show the pivotal mounting for the shield member.

FIG. 6 shows one embodiment of a shield assembly according to the invention, and FIGS. 7 and 8 show a second embodiment of a shield assembly according to the invention. In both embodiments, the shield assemblies are mounted on one body half 12 of adapter 10 without in any way modifying the body half. More particularly, in the embodiment of FIG. 6, a shield assembly, generally designated 32, is mounted on body half 12. The shield assembly includes a pair of shield halves 34 movable toward and away from each other in the direction of double-headed arrows "A" for closing and opening the open mating end 18 of the adapter. The shield halves have integral hollow journals 36 which are mutually alignable and alignable with one of the holes 20 or 22 in mounting flange 16 of body half 12. Finger tabs 38 may project outwardly of journals 36 for facilitating opening the shield halves. With journals 36 alignable with one of the holes 20 or 22 in mounting flange 16, a fastening device, such as a bolt, can be used to mount the shield halves to the adapter as well as to mount the adapter or one body half of the adapter to the other body half or directly to a support structure such a panel or the like. Coil springs are used surrounding the fastening bolt to bias shield halves 34 toward their mutually closed position. As would be known, first ends of the coil springs would be anchored to the shield halves, and the opposite ends of the coil springs would be fixed relative to mounting flange 16.

From the above, it can be understood that holes 20 and 22 in mounting flange 16, in essence, define a first mounting structure for facilitating mounting the adapter or one of the body halves of the adapter to a support structure or to a second body half. Journals 36 of shield halves 34, in essence, form a second mounting structure operatively associated with the first mounting structure for facilitating mounting the shield assembly to body half 12. Therefore, except for requiring a longer bolt, the structure of body half 12 is not changed in any way to accommodate or add shield assembly 32 thereto.

FIGS. 7 and 8 show a second embodiment of a shield assembly, generally designated 40, mountable on body half 12, again without modifying the body half in any way. Shield assembly 40 includes a one-piece shield member 44 mounted to a second rectangular mounting flange 46 which, in turn, is juxtaposed over rectangular mounting flange 16 of body half 12. Second mounting flange 46 of shield assembly 40 has four holes or slots 48 in the four corners thereof which are alignable with holes 20 and 22 in mounting flange 16 of the body half. Therefore, whatever fastening devices (such as bolts) are used to mount body half 12 to the second body half or to a support structure or panel can be used to mount shield assembly 40. The bolts simply have to be made slightly longer. Nevertheless, no modifications whatsoever are required to be made to body half 12 to mount shield assembly 40 thereto.

One-piece shield member 44 of shield assembly 40 includes an integral, depending pivot post 50 which extends into a hollow journal defined by a bore 52 in an upstanding boss 54 integral with mounting flange 46 of the shield assembly. The post has a lip 50a which snaps behind a shoulder 50b within bore 52 to hold shield member 44 on mounting flange 46 and the upstanding boss 54 thereof. Therefore, shield member 44 is pivotable about the axis of post 50 toward and away from a closed position shown in FIGS. 7 and 8 closing the open mating end 18 of body half 12. A coil spring 56 (FIG. 8) is wrapped about pivot post 50, with one end 56a of the spring anchored to the post and an opposite end 56b of the spring fixed to upstanding boss 54 of mounting flange 46. The spring is effective to bias shield member 44 toward its closed position shown in FIGS. 7 and 8.

Figure 9:
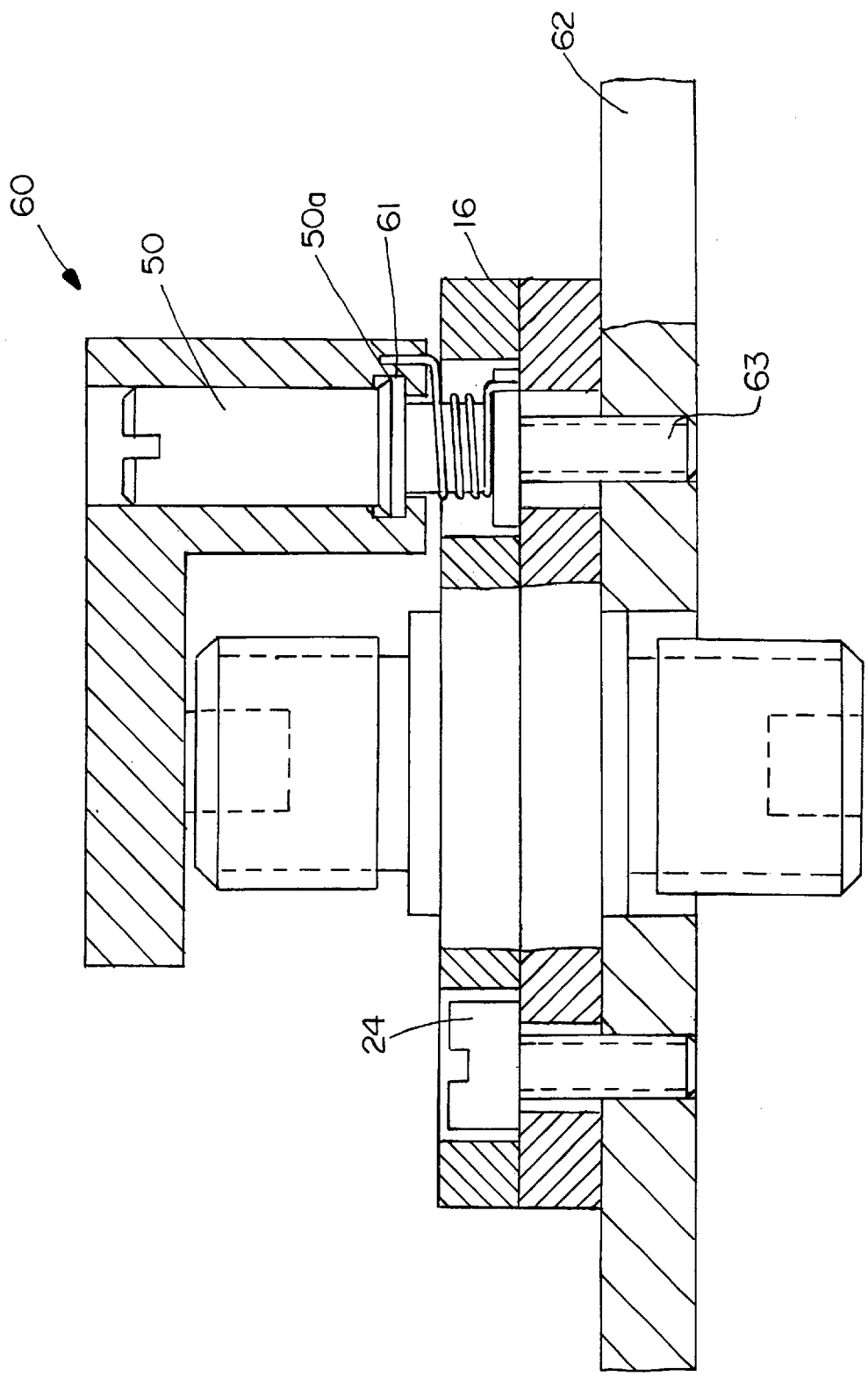
FIG. 9 is an axial section view of a third embodiment of the invention similar to the embodiment shown in FIG. 8.

FIG. 9 shows a third embodiment of a shield assembly, generally designated 60. It is similar to the second embodiment shown in FIG. 8 except that mounting plate 46 has been eliminated by having lip 50a of post 50 snap into a groove 61 in the bore 52 extending through shield member 44 enabling the shield member 44 to pivot around post 50. Post 50 terminates in a threaded end 63 adapted to engage a mounting panel 62.

In both embodiments of FIG. 6 and FIGS. 7, 8 and 9 shield halves 34 or one-piece shield member 44 are pivotable about axes generally parallel to the optic axis 30 of adapter 10 and body halves 12. In the embodiment of FIG. 6, hollow journals 36 through which the fastening bolt is inserted define the pivot axis. In the embodiment of FIGS. 7 and 8, pivot post 50 defines the pivot axis. By having the shield halves or shield member sort of slide radially over the open end of coupling 18, rather than pivoting axially toward and away from the open end, valuable space is saved in compact environments where fiber optic connectors may be used.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A connecting apparatus for receiving a fiber optic connector along an optic axis, comprising:
    a body having an open mating end and a mounting flange, the open mating end being adapted for receiving the fiber optic connector on said optic axis, and the mounting flange including a first mounting structure for facilitating mounting the apparatus to a support structure; and
    a shield assembly mounted on the body and including a movable shield for closing and opening the open mating end of the body, and a second mounting structure operatively associated with said first mounting structure for facilitating mounting the shield assembly to the body.

2. The apparatus of claim 1 wherein said first and second mounting structures include first and second alignable holes, respectively, for receiving therethrough conjointly a common fastening device.

3. The apparatus of claim 1 wherein said shield assembly includes a spring f or biasing the shield toward a closed position closing the open mating end of the body.

4. The apparatus of claim 1 wherein said shield assembly comprises a one-piece shield member movable toward and away from a closed position closing the open mating end of the body.

5. The apparatus of claim 4 wherein said second mounting structure includes a hole in a second mounting flange of the shield assembly.

6. The apparatus of claim 5 wherein said first mounting structure comprises a hole in the mounting flange of the body alignable with said hole in the second mounting flange for receiving therethrough conjointly a common fastening device.

7. The apparatus of claim 1 wherein said shield assembly comprises a pair of shield halves movable toward and away from each other toward and away from a closed position closing the open mating end of the body.

8. The apparatus of claim 7 wherein said second mounting structure includes a pair of hollow journals respectively integral with said pair of shield halves.

9. The apparatus of claim 8 wherein said first mounting structure comprises a hole in the mounting flange of the body alignable with said hollow journals for receiving therethrough conjointly a common fastening device.

10. A shield assembly for mounting on a connecting apparatus which includes an open mating end for receiving a fiber optic connector along an optic axis, comprising:
    a shield for closing and opening the open mating end of the connecting apparatus, and
    a mounting structure pivotally mounting the shield for pivotal movement about a pivot axis generally parallel to said optic axis toward and away from a closed position closing the open mating end of the connecting apparatus.

11. The shield assembly of claim 10 wherein said shield comprises a one-piece shield member.

12. The shield assembly of claim 10 wherein said shield comprises a pair of shield halves movable toward and away from each other about said pivot axis.

13. An adapter assembly for mating an optical fiber of an associated fiber optic transmission means along an optic axis, comprising:
    an adapter having a first mating end and a second mating end with a mounting flange between the ends, the first mating end being adapted for receiving the associated fiber optic transmission means on said optic axis, and the mounting flange including a first mounting structure for facilitating mounting the adapter to a support structure; and
    a shield assembly mounted on the adapter and including a movable shield for closing and opening the first mating end of the adapter, and a second mounting structure operatively associated with said first mounting structure for facilitating mounting the shield assembly to the adapter.

14. The adapter assembly of claim 13 wherein said first and second mounting structures include first and second alignable holes, respectively, for receiving therethrough conjointly a common fastening device.

15. The adapter assembly of claim 13 wherein said shield assembly includes a spring for biasing the shield toward a closed position closing the first mating end of the adapter.

16. The adapter assembly of claim 13 wherein said shield comprises a one-piece shield member movable toward and away from a closed position closing the first mating end of the adapter.

17. The adapter assembly of claim 16 wherein said second mounting structure includes a hole in a second mounting flange of the shield assembly.

18. The adapter assembly of claim 17 wherein said first mounting structure comprises a hole in the mounting flange of the adapter alignable with said hole in the second mounting flange for receiving therethrough conjointly a common fastening device.

19. The adapter assembly of claim 13 wherein said shield comprises a pair of shield halves movable toward and away from each other toward and away from a closed position closing the first mating end of the adapter.

20. The adapter assembly of claim 19 wherein said second mounting structure includes a pair of hollow journals respectively integral with said pair of shield halves.

21. The adapter assembly of claim 20 wherein said first mounting structure comprises a hole in the mounting flange of the adapter alignable with said hollow journals for receiving therethrough conjointly a common fastening device.

* * * * *